US008712365B2

(12) United States Patent
Métivier

(10) Patent No.: US 8,712,365 B2
(45) Date of Patent: Apr. 29, 2014

(54) SYSTEM FOR THE SECURE MANAGEMENT OF DIGITALLY CONTROLLED LOCKS, OPERATING BY MEANS OF CRYPTO ACOUSTIC CREDENTIALS

(75) Inventor: Pascal Métivier, Feucherolles (FR)

(73) Assignee: Openways SAS, Feucherolles (FR)

( * ) Notice: Subject to any disclaimer, the term of this patent is extended or adjusted under 35 U.S.C. 154(b) by 36 days.

(21) Appl. No.: 13/394,855

(22) PCT Filed: Aug. 16, 2010

(86) PCT No.: PCT/FR2010/051502
§ 371 (c)(1),
(2), (4) Date: Mar. 8, 2012

(87) PCT Pub. No.: WO2011/033199
PCT Pub. Date: Mar. 24, 2011

(65) Prior Publication Data
US 2012/0172018 A1 Jul. 5, 2012

(30) Foreign Application Priority Data
Sep. 16, 2009 (EP) .................................... 09170475

(51) Int. Cl.

| | |
|---|---|
| ***H04B 1/06*** | (2006.01) |
| ***H04B 1/18*** | (2006.01) |
| ***G06F 7/04*** | (2006.01) |
| ***G06F 15/16*** | (2006.01) |
| ***G06F 17/30*** | (2006.01) |
| ***H04L 29/06*** | (2006.01) |
| ***G08B 3/10*** | (2006.01) |

(52) U.S. Cl.
USPC ..... 455/352; 455/354; 455/151.4; 455/151.2; 455/550.1; 455/153.1; 340/384.73; 340/5.73; 726/7

(58) Field of Classification Search
CPC ............................... G07C 9/00309; H03J 9/04
USPC ................ 455/352, 354, 152.1, 152.2, 152.4, 455/550.1, 414.1, 153.1; 340/384.73, 5.53; 704/251, 208; 726/7
See application file for complete search history.

(56) References Cited

U.S. PATENT DOCUMENTS

| | | | | |
|---|---|---|---|---|
| 5,933,090 | A | 8/1999 | Christenson | |
| 6,161,005 | A * | 12/2000 | Pinzon | 455/403 |
| 2002/0180582 | A1 * | 12/2002 | Nielsen | 340/5.6 |
| 2008/0002567 | A1 * | 1/2008 | Bourlas et al. | 370/208 |

FOREIGN PATENT DOCUMENTS

| | | |
|---|---|---|
| WO | WO 03/093997 | 11/2003 |
| WO | WO 2007/046804 | 4/2007 |
| WO | WO 2008/107595 | 9/2008 |

OTHER PUBLICATIONS

International Search Report for PCT/FR2010/051502, mailed Nov. 10, 2010.

* cited by examiner

*Primary Examiner* — Opiribo Georgewill
(74) *Attorney, Agent, or Firm* — Nixon & Vanderhye P.C.

(57) ABSTRACT

The invention relates to a system that makes use of a mobile telephone (22) to which a user authorized to open a lock (28) has access. According to the invention, a remote management site (10) includes a database (12) of authorized users identified by the mobile telephone number thereof, as well as a data credential generator (14). The credentials are crypto acoustic credentials (CAC) in the form of single-use audio signals and are generated from digital data credentials (DDC) that are normally employed by the lock when the latter is used with a badge or a card. The system includes means (16, 18, 20) for securely transmitting the acoustic credentials to the user's telephone. The lock (22) picks up the acoustic credentials reproduced by the telephone pre-positioned near the lock and extracts the digital data credentials from the picked-up crypto acoustic credentials and, subsequently, the lock applies the thus-extracted digital data credentials to the analysis, authentication and control means of the lock.

10 Claims, 2 Drawing Sheets

SYSTEM FOR THE SECURE MANAGEMENT OF DIGITALLY CONTROLLED LOCKS, OPERATING BY MEANS OF CRYPTO ACOUSTIC CREDENTIALS

This application is the U.S. national phase of International Application No. PCT/FR2010/051502, filed 16 Aug. 2010, which designated the U.S. and claims priority to EP Application No. 09170475.9, filed 16 Sep. 2009, the entire contents of each of which are hereby incorporated by reference.

The invention relates to the lock devices electrically controlled by means of a dematerialized and encrypted key, such key being conveyable by a portable object held by a user, such as a magnetic card, a smart card, a badge or a contactless card, etc.

As used herein, "lock device" means not only a lock strictly speaking, i.e. a mechanism applied for example on a door so as to prevent the opening thereof, but also any device making it possible to obtain a comparable result, for example a lock barrel considered solely, or a more specific locking device comprising various members not grouped together in a same lock case, the final purpose being to prevent, through mechanical means, the physical access to a given place or space, and to allow access to that place or space by unlocking the lock device, upon a request from the user, after having checked that this user has actually the access rights (i) that are peculiar to him and (ii) that are peculiar to the lock device. The lock device may also comprise, or be associated with, an alarm system that must be deactivated to allow access to a given space, or conversely, activated to protect this space before or after having left it.

For the simplicity of description, it will be hereinafter simply referred to a "lock", but this term has to be understood in its wider sense, without any limitation to a particular type of equipment.

The portable object, when brought in the vicinity of the lock, acts as a key for opening the latter by means of a data, hereinafter referred to as "accreditation" (or credential). Various coding and encryption techniques may be implemented in the lock and/or in the portable object to ensure a protection against fraudulent manipulations, and to secure the communication the portable object and the lock.

Many systems based on magnetic cards, or also microcircuit cards or badges, implementing with the lock a galvanic coupling (contact smart card) or a non-galvanic coupling (inductive-coupling-based portable object or RFID card). Such coupling provides between the lock and the badge a communication making it possible in particular for the lock to read the accreditation data from the memory of the badge so as to operate the opening if the data is recognized as being compliant.

One drawback of this technique is the need for a specific portable object, which has to be given to the user and which the latter has to keep with him. This leads further to the multiplication of portable objects, each corresponding to a different lock (home, office, building door, garage, etc.), so that the whole becomes finally awkward and subjected to risks of forgetting.

Another drawback is linked to the variety of techniques of implementation, each manufacturer having its own specification both at the physical layer level (coupling technology chosen: inductive, RF, magnetic, galvanic, etc.) and at the level of data format and exchange protocols of these data between the drive and the portable object.

This variety of techniques, linked to the technological choices and to the implementations peculiar to the various manufacturers, is a brake to the interoperability, to the standardization of hardware and procedures and to the technological evolution, which hampers the fast generalization of such techniques, in spite of their indisputable advantages.

Moreover, the system is a rigid system, insofar as if it is desired to update the approvals, to cancel existing approvals or to create new ones, the portable object has to be replaced or the memory of the latter has to be updated by means of a protocol and/or a specific drive, with the need for physically handling and displacements.

One purpose of the invention is to propose another technique of management and control of locks that can complement the existing techniques, or even to replace them, without needing any substantial modification of either hardware or software, and that offers a maximum level of security, a very high flexibility, and that is usable without the need for a specific portable object.

As will be seen hereinafter, the technique of the invention can be used with any conventional mobile phone acting as the portable object conveying the lock control key, without the need for the user to use a specific and dedicated portable object, such as a badge or a card.

Therefore, the system of the invention will be immediately generalizable to the largest number of people, being usable by any one from a standard model of phone, without modification, but with all the security and all the flexibility peculiar to the modern cryptographic methods.

From the lock manufacturer point of view, the technique of the invention will make it possible to adapt, without major modification, the park of existing locks, without having to replace either the hardware elements or the software already integrated in the lock. Indeed, it will be seen that the invention is absolutely compatible with the pre-existing techniques implemented by the various current manufacturers, insofar as it limits the intervention to only one layer of the communication protocol (the transmission of the accreditation to the lock), which keeps the same logical management of the various levels of security as already provided by the manufacturer.

The principle of the invention lies on the use, for transmitting the accreditation data to the lock, of information of the encrypted acoustic accreditation type.

Such acoustic accreditations are, for example, in the form of a coded series of tones (DTMF tones or others), emitted by the loudspeaker of an emitting device and picked up by the microphone of a receiving device. Essentially, the present invention consists in translating, at a secured site, the conventional accreditation used for the access management (a data block comprising an identifier of the manufacturer, a unique identifier of the lock, and possibly additional information), into an encrypted acoustic accreditation format. Such acoustic accreditation is in the form of an audio signal that may be conveyed by audio transmission channels, in particular phone transmission channels, and reproduced as such by acoustic transducers.

The acoustic accreditation is sent this way to the mobile phone of the user, which is indexed in a database of the secured site. To use the accreditation, the user brings his phone in the vicinity of the lock and triggers the emission of the series of tones corresponding to the encrypted acoustic accreditation by the loudspeaker of his phone, so that these tones can be picked up by a microphone that is integrated in or coupled to the lock. The latter operates a reverse translation of the acoustic accreditation, making it possible to reproduce the original format of the conventional accreditation, which is then applied to the circuits of the lock in order to be processed therein in the same way as if this accreditation had been read by a standard drive coupled to the lock (magnetic or smart card drive, inductive or RFID coupling drive, etc.).

The use of acoustic accreditations is not new in itself, it has already been proposed in other contexts and for other applications, for example by the WO 2008/107595 A2 (Tagattitude).

This document describes a technique of securing the logical access to a computer network by a remote terminal, for example by a computer connected to this network via Internet. The user connects to the network with his computer and simultaneously powers up his phone and, by means of the latter, calls a control site interfaced with the network to which the access is requested. To check the user's approval, the network sends a sound signal (the acoustic accreditation) to the remote computer that has just connected, this signal being reproduced by the loudspeaker of the computer. The user having placed his phone in front of the loudspeaker, this sound signal is picked up by the phone, transmitted to the remote control site via the mobile phone network operator and "listened to" by the control site, which can then check the accreditation and authorize the access to the computer network by the terminal.

It will be noted that, in this case, it is an "upward" accreditation: the acoustic accreditation is picked up by the microphone of the phone, which forwards it to the control site. Knowing the recipient of the phone call, the control site can identify the user through the mobile phone used for that operation, and thus authorize the logical access to the network by the terminal located in the vicinity of the thus-identified phone.

In the case of the invention, the encrypted acoustic accreditations are on the contrary "downward" accreditations, i.e. they come from a remote management site and are transmitted to the mobile phone of the user.

More precisely, the present invention relates, in a manner known in itself, to a secured system for controlling the opening of lock devices, comprising at least one lock device provided with electronic circuits for the conditional control of locking/unlocking mechanical members based on digital accreditation data. Said lock device comprises means for recognizing, analyzing and authenticating said digital accreditation data, and means for unlocking the mechanical members upon recognizing compliant digital accreditation data.

Characteristically of the invention, the system also comprises a mobile phone at the disposal of a user authorized to open the lock device, a remote management site, and a mobile network operator. The management site comprises a database of approved users with, for each user, an identifier associated with a mobile phone number, means for receiving as an input digital accreditation data adapted to allow the opening of specific lock devices, and a generator of encrypted acoustic accreditations comprises means for converting the digital accreditation data into encrypted acoustic accreditations in the form of single-use audio signals. The mobile network operator is coupled to the management site and to the mobile phone, with means for the secured transmission of the encrypted acoustic accreditations from the management site to the user's mobile phone, the phone comprising an electro-acoustic transducer adapted to reproduce said encrypted acoustic accreditations.

The system of the invention is also characterized in that the lock device comprises an acoustic module comprising an electro-acoustic transducer capable of picking up encrypted acoustic accreditations reproduced by the phone's transducer previously placed in the vicinity of the lock device. The acoustic module further comprises means for extracting the digital accreditation data from the encrypted acoustic accreditation picked up by the transducer, and means for applying to the means for recognizing, analyzing and authenticating the so-extracted digital accreditation data.

Advantageously, the encrypted acoustic accreditation produced by the acoustic accreditation generator comprises a field resulting from the conversion of the digital accreditation data, and a variable field, with a different content for each encrypted acoustic accreditation generated. This variable field can in particular be a sequence number or a time stamp, in which case the acoustic module further comprises means for memorizing at each use the sequence number or the time stamp of the encrypted acoustic accreditation having allowed the unlocking of the mechanical members, and for comparing and checking the compliance of the sequence number or the time stamp of any latter encrypted acoustic accreditation.

The digital accreditation data may be: data coming from the database of the management site, which also memorizes lock device information with, for each lock device, a unique associated identifier, a list of approved users with corresponding data of access rights, and possibly additional information; data transmitted in line to the management site by a third-party site; data transmitted off line, in batches, to the management site by a third-party site; data delivered by a drive coupled to a physical medium memorizing the digital accreditation data; and combinations of the above-mentioned data.

In an advantageous embodiment, the acoustic module further comprises means for producing return acoustic signals, upon picking up of digital accreditation data, and an electro-acoustic transducer capable of reproducing these return acoustic signals. These latters may in particular comprise a time marker emitted during, or immediately after, the reception of the acoustic accreditation, this marker being emitted at a time instant corresponding to a predetermined time position, peculiar to the lock device, with respect to the acoustic accreditation.

As a variant or in addition, the acoustic module further comprises means for defining an additional parameter of transmission of the accreditation, means for producing, before any acoustic accreditation emission, an acoustic message encoded by said additional parameter, and an electro-acoustic transducer capable of reproducing this acoustic message. The phone comprises an electro-acoustic transducer capable of picking up the acoustic message, and means for transmitting to the management site a message coded by this acoustic message. The encrypted acoustic accreditation produced by the acoustic accreditation generator includes the additional parameter, and the acoustic module also comprises means for checking the compliance of the additional parameter included in the picked up acoustic accreditation.

This additional parameter may be a password generated by the acoustic module and added as a variable field to the acoustic accreditation produced by the cryptographic generator. It may also be a time offset applied to the emission of the acoustic accreditation produced by the cryptographic generator.

An exemplary embodiment of the device of the invention will now be described, with reference to the appended drawings in which same reference numbers designate identical or functionally similar elements through the figures.

FIG. 1 schematically illustrates the main elements contributing to the operation of the system according to the invention;

Figure 1:
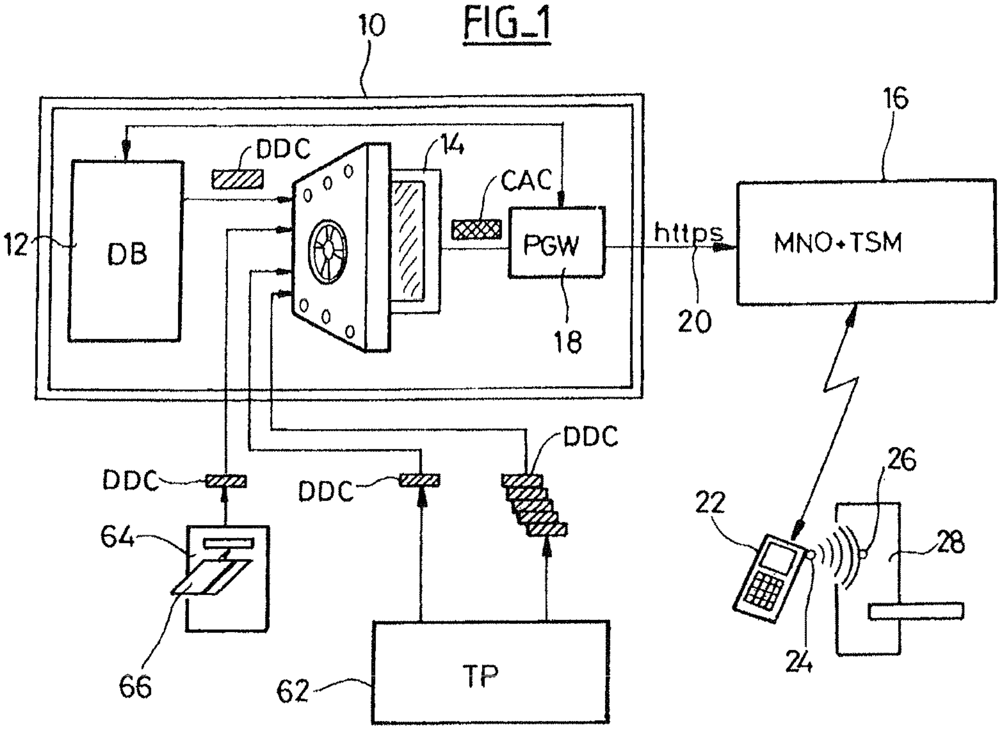

The various elements for the implementation of the invention will be firstly described with reference to FIGS. 1 and 2. And various embodiments thereof, as well as improved variants making it possible to reinforce the security thereof, will then be exposed.

General Architecture of the System

One of the essential elements of the invention is a secured management site 10 centralizing in a database DB 12 the information for inventorying and identifying a number of locks and of approved users for each of said locks. For each user, the database indexes a unique mobile phone number associated with this user, as well as data about access rights and conditions of use (access reserved to some days or some time slots, expiry date of an access right, etc.).

Besides the approved users, the database also indexes for each lock a UID (Unique IDentifier) that is uniquely assigned and that permits to univocally identify the lock in the various data exchange protocols.

Other data may also be stored in the database, in particular the algorithms used by the lock, one or several cryptographic keys, a simplified free name ("front door", "garage", "cellar", etc.) to facilitate the selection by a user of one among several locks, etc.

The management site 10 also comprises a cryptographic engine forming a generator 14 of accreditation data.

Characteristically of the invention, the "accreditation data" (credentials) are encrypted acoustic accreditations or CAC (Crypto Acoustic Credential) in the form of single-use audio signals, for example (but in a non-limitative way) consisted of a succession of double DTMF tones. These audio signals are designed so that they can be conveyed, after having been digitized, by phone audio transmission channels and reproduced as such by acoustic transducers.

The management site 10 is coupled to a network 16 of a mobile phone operator, or MNO (Mobile Network Operator), through an audio phone gateway PGW (Phone Gate Way) 18 and a secured connection 20, for example an IP connection of the https type, so that the acoustic accreditations can be conveyed from the generator 14 to the user's phone 22 by the audio transmission channels (voice channel) of the mobile phone network.

The mobile phone network 16 is conventionally used by the various subscribers thereof, each user having his own mobile phone 22, which is individualized by the information of the SIM card contained in the phone or by another unique element if the phone operates without a SIM card. Then, when he uses his personal mobile phone, a user is recognized and identified by the network 16 by means of his subscriber number, and thus in the same way by the management site 10.

The securing of the connection between the network 16 and the mobile phone 22 may be operated through a Trusted Service Provider, or TSM (Trusted Service Manager), capable of efficiently and securely ensuring the various hereinafter-described procedures of exchange or transmission of information between the management site 10 and the mobile phone 20, via the phone network operator 16.

In the case of a key materialized by a medium such as a card or a badge, a significant part of the security is ensured by the physical delivery of this object to the lawful user, in the same way as the delivery of a set of keys. On the other hand, within the framework of the invention, the object used is a mobile phone, hence an unmarked object. But the latter is recognized and authenticated by the SIM card contained therein (or by another unique element) and that, above all, identifies the user via his phone number (subscriber number). The management site 10 is thus able to identify a phone to which it has been connected via the mobile network operator 16 as being actually that of the approved user, indexed in its database 12. The implementation of the invention involves making the loudspeaker 24 of the mobile phone 22 reproduce, as an audio signal, the encrypted acoustic accreditation generated by the cryptographic generator 14 and transmitted as a vocal signal, by means of the phone gateway 18 and the mobile network operator 16.

The accreditation reproduced by the loudspeaker 24 of the mobile phone is intended to be picked up by a microphone 26 of a lock 28 in order to operate the opening of this lock. The matter is to make it possible for the user, owner of the number of the mobile phone 22 known by the database 12, to give to the lock 28 the proof that he has actually the identity he declares, and that he has the access rights allowing the opening of this lock. The sound signal reproduced thus forms a proof of the user's identity and opening rights, hence the term "acoustic accreditation". Such acoustic accreditation is further encrypted (by cryptographic means known in themselves), and is of single use, so as to avoid any fraud by recording and duplication because it would be otherwise very easy to record the acoustic signal and to thereafter reproduce it at will.

Figure 2:
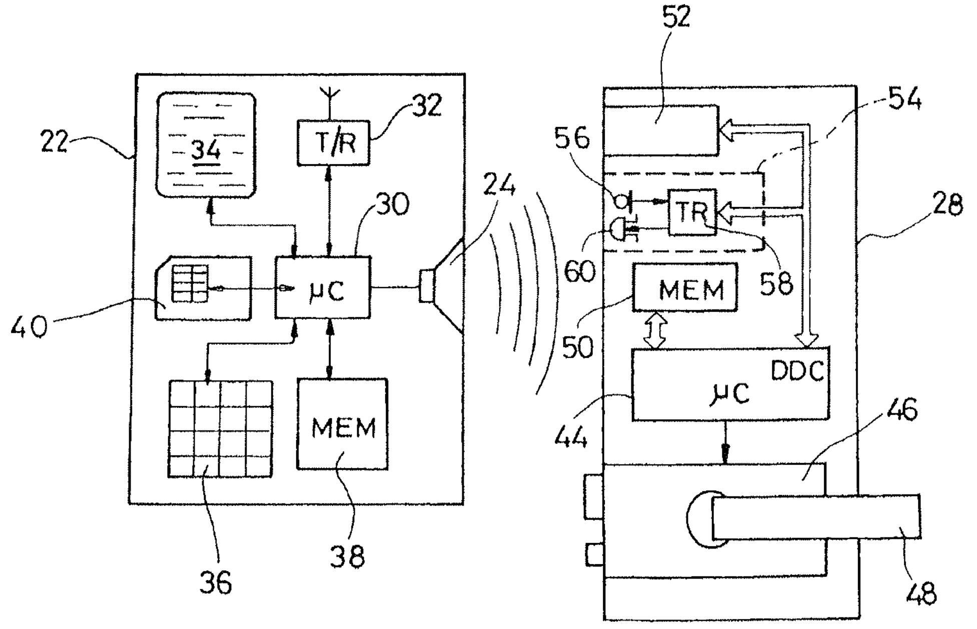
FIG. 2 illustrates more precisely, as a block diagram, the main members constituting the mobile phone and the lock to which the latter is coupled.

FIG. 2 illustrates, as a block diagram, the main members of the mobile phone 22 and of the lock 28.

The phone 22 comprises a microcontroller 30 coupled to various peripheral members such as emitting/receiving circuit 32, display 34, keyboard 36, data memory 38, UICC (Universal Integrated Circuit Card, corresponding to the "SIM card" for the GSM phone functions) 40, and acoustic transducer 24.

Various precautions known in themselves may be provided for increasing the security of the process, in particular by an additional validation asked to the user, for example the input of a personal code of the "PIN code" type, or a validation of the biometric type, by means of a biometric drive incorporated in the phone or by a voice print recognition system using the phone's microphone (wherein the specific biometric print may be stored in the memory 38 of the phone, or in the UICC card 40, or in the database 12).

The lock 28 comprises a microcontroller 44 as well as an electromechanical system 46 for operating the unlocking of a sliding bolt or a handle 48 upon a command from the microcontroller 44. A data memory 50 stores various modifiable data peculiar to the lock, in particular:

- the UID (Unique IDentifier) for univocally recognizing this lock among all the others;
- recognizing and decoding algorithms;
- cryptographic keys;
- as well as other parameters specific to the implementation of the invention and that will be described hereinafter.

Many lock models of the type exist, which are proposed by a great number of manufacturers. The opening thereof is controlled by a drive module 52 integrated to the lock, which comprises an interface for communication with a key or a badge, by a coupling that may be galvanic (smart card drive) or non-galvanic (optical drive for a badge with a barcode, magnetic card drive, inductive of RF coupling contactless drive, etc.). The drive 52 delivers to the microcontroller 44 a digital data accreditation, hereinafter referred to as DDC (Digital Data Credential), with a format and a content peculiar to each manufacturer and that typically (but not exclusively) comprises, as illustrated in line a of FIG. 3:

a manufacturer identifier VID (Vendor ID), the unique identifier UID of the card, and a field DATA (optional) containing various data necessary or useful for controlling the lock operation.

Such digital data accreditation DDC, read by the module 52 in a key or a badge that the user has coupled to this module, is analyzed by the microcontroller 44 that conditionally delivers an authorization for opening the lock 46 if the required criteria are fulfilled, in particular the compliance of the UID.

The invention proposes to replace the module 52, or to complement this module 52, by a module 54 capable of processing accreditations sent to the lock in the form of acoustic accreditations CAC emitted by a mobile phone 22, instead of digital accreditations DDC read in a card or a badge coupled to the module 52.

The acoustic module 54 is provided with an acoustic transducer in the form of a microphone 56 for picking up the surrounding sound signals, in particular the acoustic accreditation that will be reproduced by the loudspeaker 24 of the phone 22, and for transforming the picked up acoustic signals into digital signals applied to a transducer stage 58, to convert the acoustic accreditations CAC into signals of the same format as the digital data accreditations DDC that the module 52 would have provided by reading of a badge or a card.

The acoustic module 54 also advantageously comprises a transducer 60 for reproducing an sound signal emitted by the stage 58 and that can be heard from the outside of the lock, wherein the transducer 60 may comprise a loudspeaker or, in a simplified version, a simple component of the buzzer type. It is also possible to use the transducer 46 of the acoustic module 54 by making it operate in the reverse mode (to emit audio signals instead of picking them up).

Implementation of the Invention

Various operating modes for implementing the invention with the different elements of the system just described will now be described.

The first purpose of the invention is to replace, or complement, the "proprietary" technology specific to the manufacturer and implemented in the drive module 52, by a versatile technology based on encrypted acoustic accreditations CAC, which can be implemented without substantial modification of the lock elements, both hardware and software.

The basic principle consists in keeping the original digital data accreditations (DDC) with their content and format, peculiar to the manufacturer, and in converting these DDCs into acoustic accreditations CAC, transmitting the CAC to the phone, and making the user reproduce, by means of the loudspeaker of his mobile phone, the so-transmitted acoustic accreditation CAC. The accreditation picked up by the acoustic module 54 is then subjected to a reverse conversion, operated by the translation stage 58 incorporated to the acoustic module 54, so as to reconstruct the original digital data accreditation DDC based on the acoustic accreditation CAC that has been picked up.

A preliminary step thus consists in converting the digital accreditation DDC into an encrypted acoustic accreditation CAC.

The digital accreditation DDC may have several origins (see FIG. 1), being generated:

in real time by a third-party site 62, i.e. on demand of the user at the moment when the latter wants to open the lock;

by the third-party site 62, in "off-line" mode, the accreditations being delivered in advance as batches;

manually, by means of a drive 64, from a conventional key or badge 66;

or directly by the secured site 10, the digital accreditation DDC being kept in the database 12.

These accreditations DDC in the form of digital data blocks are converted into acoustic accreditation CAC by the cryptographic engine 14 of the secured site 10.

Figure 3:
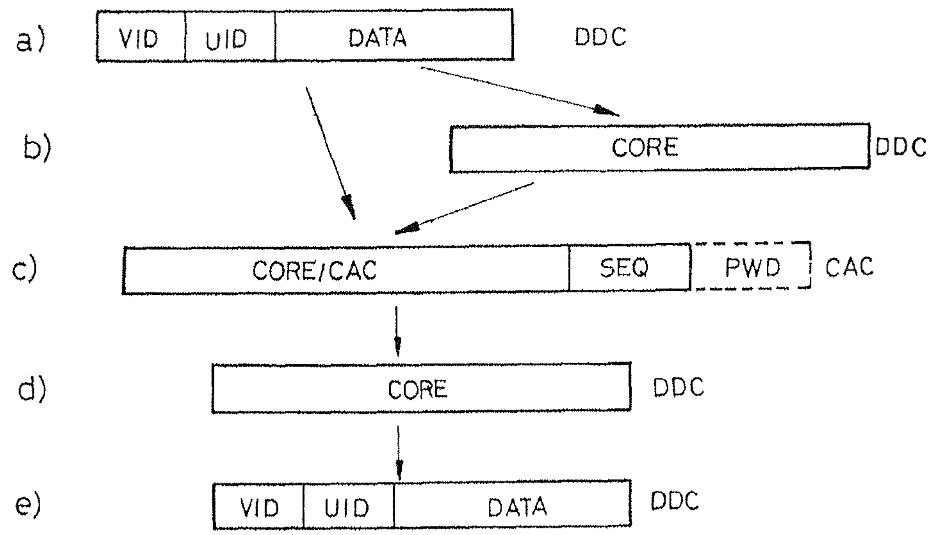
FIG. 3 illustrates the various transformations undergone by the accreditation during the steps implemented by the invention.

As illustrated in FIG. 3, the conversion may be performed from a data block, in which the fields VID, UID and DATA are explicit, to a field CORE/CAC of the acoustic accreditation CAC (from line a to line c of FIG. 3). However, the cryptographic engine may perfectly receive at this stage the information in a non-explicit form (CORE), which is directly converted to give the field CORE/CAC of the acoustic accreditation CAC (from line b to line c of FIG. 3). Indeed, the content of the digital accreditation DDC is not required to be known for operating the conversion, which simply consists in creating an acoustic "envelope" into which is "slipped" the digital accreditation DDC, whatever the content of the latter is, because the cryptographic engine 14 does not need to know the definition of the fields, the coding, etc., of the accreditation DDC.

The cryptographic engine 14 also adds to the field CORE/CAC containing the accreditation data themselves a variable field, different at each acoustic accreditation generation, so as to make this acoustic accreditation unique. It may be a data produced by a pseudo-random generator or, preferably, a sequence number SEQ. The field SEQ may be a counter incremented at each accreditation generation by the cryptographic generator 14, or a time stamp that will be functionally equivalent to the incrementation of a counter.

The cryptographic engine 14 may also provide adding a password PWD to the acoustic accreditation CAC for further increasing the process security. When he desires to obtain the opening of the lock in front of which he is standing, the user contacts the management site by any suitable means. This may be obtained by calling a phone number, or by sending a message (SMS, MMS, e-mail, instantaneous messaging, etc.) to the server, which will call back the user's phone to deliver him the authorization as an encrypted acoustic accreditation.

In an "in-line" mode of implementation, the transmission of this accreditation is carried out immediately and directly. In a variant, it may also be carried out through a method of the "call back" type: in this case, the user enters in telephonic contact with the management site, which does not answer immediately, but which, after hanging up, makes the mobile phone ring so that the user can once again establish the contact with the site, and this is at that moment that the acoustic accreditation is delivered to him. Whatever the way the user enters into contact with the remote site, the latter delivers directly the acoustic accreditation to the user, without intermediate storage.

This mode is particularly simple to implement, insofar as it just requires the use of the existing infrastructure, without a previous adaptation of the phone, in particular without the need to load an applet, notably of the midlet or cardlet type. Hence, the invention may be implemented with any type of mobile phone, even a very simple one, and without any previous intervention on the latter. Another advantage lies in the possibility to check in real time the accreditation validity, with for example the possibility to immediately take into account a "black list" of users. Moreover, with this in-line mode, it is possible to have, at the management site, a lot of information about the use of the acoustic accreditation, in particular the date and time of use, and possibly the geographic location of the user (by identifying the cell of the network from which the user calls). On the other hand, this mode requires having access to the mobile network, which is not always possible (underground parking lots, non-covered areas, etc.). Moreover, in principle, it does not make it possible to have, for selection by the user, several accreditations corresponding to several possible locks, insofar as it is necessary to have a "one-to-one" match between accreditation and lock.

Another, off-line, mode of implementation may be used, in particular if the access to the network is not ensured at the moment of use. In this case, the user connects in advance to the management site and receives from the latter a predetermined number of acoustic accreditations. These accreditations are securely stored in the phone or in a peripheral memory of the phone (for example an SD or MicroSD card). When the user wants to reproduce an acoustic accreditation in order to open a lock, he launches an application integrated to his phone, which finds the first accreditation among those that have been stored, reproduces it to open the door, and cancels it from the memory. And so on, in order to use the following accreditations. The application providing this implementation is an applet stored in the phone, previously sent to the latter by the mobile network operator, or by download on an external medium (SD or MicroSD card), or via an Internet connection. In case of download via the mobile network operator, the management site will have beforehand sent a message to the phone, for example of the "SMS", "push SMS" or "WAP push" type, in order to identify the brand and model of the latter and to present to the user a link for downloading the applet. When the stock of accreditations memorized in the phone will be exhausted, or on the way of exhaustion, and the user will be again capable of acceding to the network, this stock of accreditations will be replenished to permit latter uses. It is possible to take advantage of the connection to the network to send, at the same time, to the management site, a number of feedback information, in particular a dated history of use of the previous accreditations.

In any case, and whatever the mode of transmission of the encrypted acoustic accreditation CAC, when he wants to obtain the opening of the lock, the user places his mobile phone in the vicinity of the lock he wants to unlock and triggers the emission of the acoustic accreditation CAC, in the form of a sound signal.

As explained above, the acoustic module 54 of the lock receives this encrypted acoustic accreditation CAC (corresponding to line c in FIG. 3). The translation stage 58 then extracts therefrom the data block CORE (line d in FIG. 3), that is to say, by way of illustration, that he "opens the (acoustic) envelope" containing these data. It is then possible to obtain, directly or after decoding, the digital data accreditation DDC (line e in FIG. 3) with its different useful fields VID, UID and DATA, which is identical to the corresponding accreditation DDC, before the latter has been converted by the cryptographic engine (line a in FIG. 3).

The accreditation DDC, which is in every respect identical to that which would have been read by the module 52 from a conventional key or badge, according to the prescriptions peculiar to the manufacturer, is applied to the microcontroller 44 for analysis, check and conditional unlocking of the lock control system 46.

It will be noted that the different check operations carried out by the microcontroller 44 are identical to those that would have be carried out based on information read in a conventional manner by the module 52, according to the specifications peculiar to each manufacturer. The role of the translator stage 58 is simply to "open the envelope" of the acoustic accreditation CAC to extract therefrom the digital information DDC that had been beforehand placed in this envelope by the cryptographic engine 14, but without acting on the content of this digital accreditation DDC.

Detection of Frauds by Signal Pick Up

Various measures may be contemplated to avoid the frauds, in particular those that would consist in recording the audio signal reproduced by the phone at the moment of use, and using this recorded signal to open another lock, and to try to obtain a new opening of the same lock (whereas the accreditation is normally of single use and has to be renewed each time).

1°) Control of the Acoustic Accreditation Uniqueness:

Due to the presence of the unique field SEQ generated different at each version of the acoustic accreditation CAC, the system never produces two identical acoustic accreditations. Therefore, the acoustic module of the lock must be able to detect and refuse an accreditation that would have already been produced, and that would thus be a fraudulently picked up and reused accreditation.

For that purpose, during the initialization of the lock (at the time of installation of the acoustic module 54 or during a reset of the latter), a register of the module 54 is set to zero. At the first use, i.e. when the first acoustic accreditation CAC is picked up, the module 54 memorizes the sequence number SEQ included in this acoustic accreditation (or the date and time, in case of time stamp).

A each latter use, the module 54 checks that the sequence number of the picked up accreditation is higher than the sequence number it had kept in memory in the register (or checks that the date and time are later than the corresponding information memorized). If it is not the case, the opening is refused, because it is a fraud. On the other hand, if the condition is actually fulfilled, the lock is unlocked and the register is updated with the new number of sequence (or with the new values of date and time).

Figure 4:
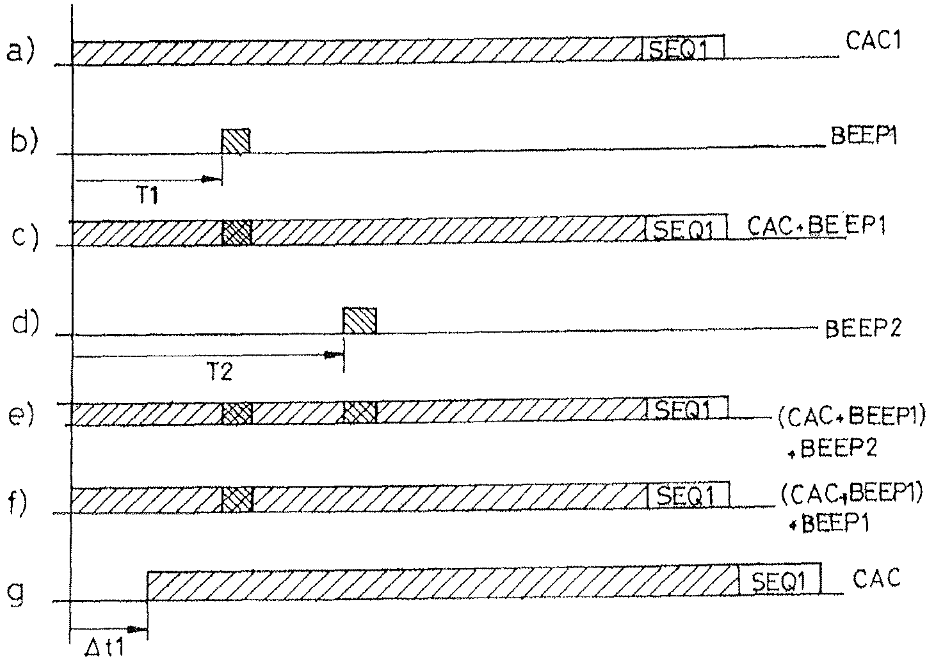
FIG. 4 is a series of timing diagrams illustrating the various security techniques permitting to ensure the unique use of the acoustic accreditation within the framework of the invention.

2°) Generation of a Time Mark by the Lock:

Another measure of precaution, explained notably with reference to FIG. 4, consists in making the loudspeaker or buzzer 60 of the acoustic module 54 emitting, during the reception of the acoustic accreditation CAC or just after the latter, an acoustic noise or "beep" at a predefined time instant, always the same for a given lock but always different from one lock to one another.

In line a of the timing diagram of FIG. 4 is illustrated the acoustic accreditation CAC emitted by the phone, and in line b, the beep, designated BEEP1, emitted by the acoustic module 54 at a time instant offset of $T_1$ with respect to the beginning of the reception of the accreditation CAC. The signal heard in the vicinity of the phone, and thus liable to be recorded, is the signal illustrated in line c, with superimposition of the signal CAC emitted by the phone and of the signal BEEP1 emitted by the acoustic module of the lock.

If a fraudster records this combined signal and presents it to another lock as an acoustic accreditation, this other lock will emit a noise BEEP2 according to the same technique as the first one, but at a different time position $T_2$ (line d of FIG. 4).

The combined signal received by the acoustic module of this other lock will thus be the signal illustrated in line e of FIG. 4, i.e. a signal comprising two acoustic noises BEEP1 and BEEP2. The presence of these two noises will be immediately recognized by the acoustic module, which will refuse the opening.

It will be noted that, if the fraudster had presented again to the same lock (and no longer to another lock) the acoustic accreditation CAC he had recorded, the latter would correspond to the line f of FIG. 4, with therefore an acoustic noise BEEP1 mixed up with the one emitted at the same time by the acoustic module 54. But in this case, the sequence number SEQ1 would be equal to, or lower than, the one already recorded in the memory of the acoustic module of the lock, which will then be able to detect the fraud because of this non-compliant sequence number SEQ2.

Additional Security Features with Bidirectional Communication

A bidirectional communication may be established with the secured site 10 if it is possible for the phone to obtain a connection with the network at the moment of use, which makes it possible to send back to the latter information coming from the phone.

In particular, before the generation of the acoustic accreditation CAC, the acoustic module 54 of the lock may produce a password, in an acoustic form, which is picked up by the phone's microphone, and transmitted to the network and to the remote site 10 to be incorporated to the acoustic accreditation CAC that will be generated by the cryptographic engine 14 (field PWD of line c in FIG. 3). The acoustic accreditation CAC thereafter reproduced by the phone will thus include this password, which will then be able to be decoded by the acoustic module 54, which will check that it matches with the one that has just been generated by this same module.

As a variant or in addition to this password, another security feature consists in making the acoustic module 54 generate a delay or time offset value $\Delta t_1$, that is each time different (for example, a random delay), and in transmitting it to the secured site 10 so that the latter adds this time offset $\Delta t_1$ to the acoustic accreditation CAC when the latter is emitted (line g in FIG. 4). The acoustic module 54 then checks, when receiving the acoustic accreditation CAC, that the latter actually starts with a time offset $\Delta t_1$, introduced by the remote server, which is equal to the offset value that it has itself generated just before and sent to the server.

The invention claimed is:

1. A secured system for controlling the opening of lock devices, comprising:

at least one lock device provided with electronic circuits for the conditional control of locking/unlocking mechanical members based on digital accreditation data (DOC), said lock device comprises a microcontroller configured for recognizing, analyzing and authenticating said digital accreditation data, and for unlocking the mechanical members upon recognizing compliant digital accreditation data;

a mobile phone at the disposal of a user authorized to open the lock device;

a remote management site comprising:

a database of approved users with, for each user, an identifier associated with a mobile phone number an input for receiving digital accreditation data (DOC) adapted to allow the opening of specific lock devices, and a generator of encrypted acoustic accreditations configured to convert said digital accreditation data (DOC) into encrypted acoustic accreditation (CAC) in the form of single-use audio signals; and a mobile network operator, coupled to the management site and to the mobile phone, and configured for the secured transmission of the encrypted acoustic accreditations from the management site to the user's mobile phone, the phone comprising an electro-acoustic transducer adapted to reproduce said encrypted acoustic accreditations, wherein the lock device comprises an acoustic module comprising:

an electro-acoustic transducer capable of picking up encrypted acoustic accreditations reproduced by the phone's transducer previously placed in the vicinity of the lock device;

said acoustic module configured to extract said digital accreditation data (DOC) from the encrypted acoustic accreditation (CAC) picked up by the transducer, and to apply to said microcontroller the so-extracted digital accreditation data (DDC), wherein said acoustic module is configured to define an additional parameter of transmission of the accreditation and to produce, before any acoustic accreditation emission, an acoustic message encoded by said additional parameter; and further including an electro-acoustic transducer capable of reproducing said acoustic message, wherein said mobile phone comprises an electro-acoustic transducer configured to pick said acoustic message and to transmit to the management site a message coded by the acoustic message;

the encrypted acoustic accreditation (CAC) produced by the acoustic accreditation generator includes said additional parameter, wherein the acoustic module is configured to checking the compliance of the additional parameter included in the picked up acoustic accreditation.

2. The system of claim 1, wherein the encrypted acoustic accreditation (CAC) produced by the acoustic accreditation generator comprises:

a field (CORE/CAC) resulting from the conversion of said digital accreditation data (CAC), and a variable field, with a different content for each encrypted acoustic accreditation generated.

3. The system of claim 2, wherein:

said variable field is a sequence number (SEQ) or a time stamp, and the acoustic module is configured to memorize at each use the sequence number (SEQ) or the time stamp of the encrypted acoustic accreditation (CAC) having allowed the unlocking of the mechanical members, and to compare and check the compliance of the sequence number or the time stamp of any latter encrypted acoustic accreditation.

4. The system of claim 1, wherein said digital accreditation data (DDC) are data from the group consisted of:

data coming from the database of the management site, which also memorizes lock device information with, for each lock device a unique associated identifier, a list of approved users with corresponding data of access rights;

data transmitted in line to the management site by a third-party site;

data transmitted off line, in batches, to the management" site by a third-party site;

data delivered by a drive coupled to a physical medium memorizing the digital accreditation data; and combinations of the above-mentioned data.

5. The system of claim 1, wherein the acoustic module is configured to produce return acoustic signals, upon picking up of digital accreditation data, and includes an electro-acoustic transducer capable of reproducing said return acoustic signals.

6. The system of claim 5, wherein said return acoustic signals comprise at least one time marker (BEEP1, BEEP2)

emitted during, or immediately after, the reception of the acoustic accreditation (CAC), this marker being emitted at a time instant corresponding to a predetermined time position (T1, T2), peculiar to the lock device, with respect to the acoustic accreditation.

7. The system of claim 1, wherein said additional parameter is a password (PWO) generated by the acoustic module and added as a variable field to the acoustic accreditation (CAC) produced by the cryptographic generator.

8. The system of claim 1, wherein said additional parameter is a time offset (Δt1) applied to the emission of the acoustic accreditation (CAC) produced by the cryptographic generator.

9. A secured system for controlling the opening of lock devices, comprising:

at least one lock device provided with electronic circuits for the conditional control of locking/unlocking mechanical members based on digital accreditation data (DOC), said lock device comprises a microcontroller configured for recognizing, analyzing and authenticating said digital accreditation data, and for unlocking the mechanical members upon recognizing compliant digital accreditation data;

a mobile phone at the disposal of a user authorized to open the lock device;

a remote management site comprising:

a database of approved users with, for each user, an identifier associated with a mobile phone number an input for receiving digital accreditation data (DOC) adapted to allow the opening of specific lock devices, and a generator of encrypted acoustic accreditationsconfigured to convert said digital accreditation data (DOC) into encrypted acoustic accreditation (CAC) in the form of single-use audio signals; and a mobile network operator, coupled to the management site and to the mobile phone, and configured for the secured transmission of the encrypted acoustic accreditations from the management site to the user's mobile phone, the phone comprising an electro-acoustic transducer adapted to reproduce said encrypted acoustic accreditations, wherein the lock device comprises an acoustic module comprising:

an electro-acoustic transducer capable of picking up encrypted acoustic accreditations reproduced by the phone's transducer previously placed in the vicinity of the lock device, said acoustic module configured to extract said digital accreditation data (DOC) from the encrypted acoustic accreditation (CAC) picked up by the transducer, and to apply to said microcontroller the so-extracted digital accreditation data (DDC), wherein the encrypted acoustic accreditation (CAC) produced by the acoustic accreditation generator comprises:

a field (CORE/CAC) resulting from the conversion of said digital accreditation data (CAC), and a variable field, with a different content for each encrypted acoustic accreditation generated, wherein said variable field is a sequence number (SEQ) or a time stamp, and the acoustic module is configured to memorize at each use the sequence number (SEQ) or the time stamp of the encrypted acoustic accreditation (CAC) having allowed the unlocking of the mechanical members, and to compare and check the compliance of the sequence number or the time stamp of any latter encrypted acoustic accreditation.

10. A secured system for controlling the opening of lock devices, comprising:

at least one lock device provided with electronic circuits for the conditional control of locking/unlocking mechanical members based on digital accreditation data (DOC), said lock device comprises a microcontroller configured for recognizing, analyzing and authenticating said digital accreditation data, and for unlocking the mechanical members upon recognizing compliant digital accreditation data;

a mobile phone at the disposal of a user authorized to open the lock device;

a remote management site comprising:

a database of approved users with, for each user, an identifier associated with a mobile phone number an input for receiving digital accreditation data (DOC) adapted to allow the opening of specific lock devices, and a generator of encrypted acoustic accreditations configured to convert said digital accreditation data (DOC) into encrypted acoustic accreditation (CAC) in the form of single-use audio signals; and a mobile network operator, coupled to the management site and to the mobile phone, and configured for the secured transmission of the encrypted acoustic accreditations from the management site to the user's mobile phone, the phone comprising an electro-acoustic transducer adapted to reproduce said encrypted acoustic accreditations, wherein the lock device comprises an acoustic module comprising:

an electro-acoustic transducer capable of picking up encrypted acoustic accreditations reproduced by the phone's transducer previously placed in the vicinity of the lock device;

said acoustic module configured to extract said digital accreditation data (DOC) from the encrypted acoustic accreditation (CAC) picked up by the transducer, and to apply to said microcontroller the so-extracted digital accreditation data (DDC), wherein the acoustic module is configured to produce return acoustic signals, upon picking up of digital accreditation data, and includes an electro-acoustic transducer capable of reproducing said return acoustic signals, wherein said return acoustic signals comprise at least one time marker (BEEP1, BEEP2) emitted during, or immediately after, the reception of the acoustic accreditation (CAC), this marker being emitted at a time instant corresponding to a predetermined time position (T1, T2), peculiar to the lock device, with respect to the acoustic accreditation.

* * * * *